United States Patent Office 3,229,322
Patented Jan. 18, 1966

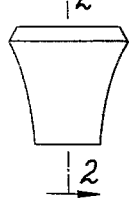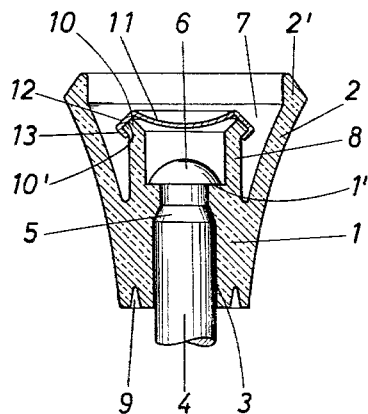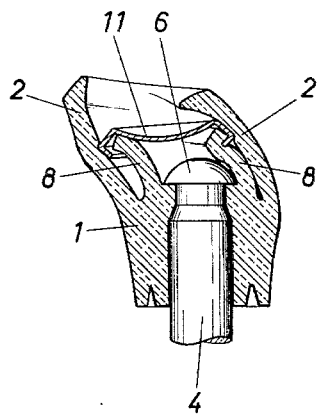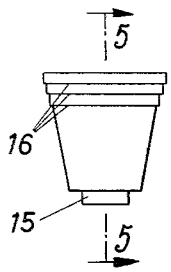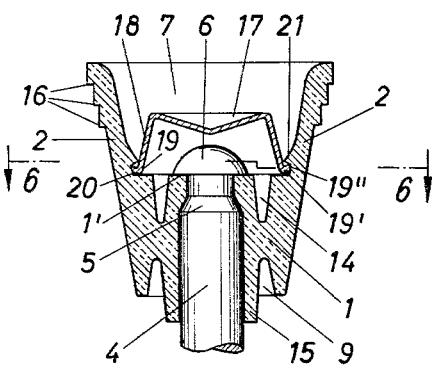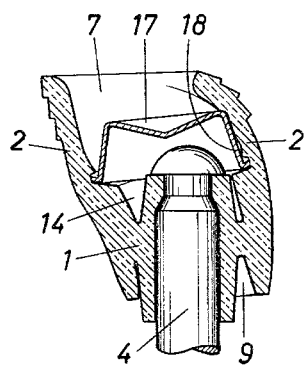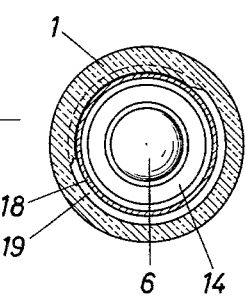

3,229,322
SERVICE KNOB, PARTICULARLY FOR THE
EQUIPMENT OF AUTOMOTIVE VEHICLES
Gerhard Herr, Wuppertal-Vohwinkel, Kurt Cziptschirsch, Wuppertal-Elberfeld, and Gert Mahler, Krahwinkler Brucke, Germany, assignors to Firma Gebr. Happich G.m.b.H., Wuppertal-Elberfeld, Germany, a corporation of Germany
Filed Feb. 18, 1964, Ser. No. 345,637
Claims priority, application Germany, June 24, 1963, H 49,534; June 26, 1963, H 49,557
8 Claims. (Cl. 16—121)

The present invention relates to a service knob, particularly for switches, slides, window cranks or the like, to be mounted in automotive vehicles.

In order to obtain a sufficient protection against accidents, service knobs have been designed already such, that a disc-shaped, thick-walled bottom portion containing a hub for a short carrying pin transmitting the form stability necessary for the service is provided, which bottom portion continues into thinner walls of elastic-yielding material, which are formed to an elastic-yielding, conical sleeve having at its free outer edge a larger diameter than that of the bottom portion, which conical sleeve limits a crucible-shaped hollow space. It is further known in connection with these knobs, to fill up the crucible-shaped hollow space with an elastic pillow, for instance, of foam material, which abuts against a shoulder of the upper edge of the walls, or to provide a cover, which is spread in with its edge against the inner face of the wall.

In all known embodiments, the difficulty exists according to experiences, to obtain a continuous increase of the deforming resistance adjusted to the jolting force and jolting direction, also in case of variable jolting charges upon the service knob.

It is, therefore, one object of the present invention to provide a service knob such, that it has an additional central supporting element, which exerts, on the one hand, a stabilizing effect onto the bottom zone, and, on the other hand, becomes effective only in case of comparatively great jolting forces, whereby a progressive increase of the pillow resistance is brought about and particularly overgrips the carrying pin in an accident preventing manner.

It is another object of the present invention to provide a service knob, which comprises a freely standing, hollow core emerging from the bottom portion of the knob and overlapping the head of the carrying pin, which hollow core avoids, in case of a deformation of the knob, leading to an engagement of the elastic-yielding knob wall with progressive increase of the pillow resistance.

Due to this design, it is achieved that in case of lateral accidental jolts upon the service knob, at first the free movability of the walls of the crucible-like hollow space provides a pillowing effect. In case of very strong accidental jolts, the extensive deformation of the crucible wall caused thereby leads finally to the situation, that this wall abuts the core disposed inside of the hollow space. From here on, the pillow resistance is greater. An additional resistance force is obtained, which brings about a deformation or displacement of the core and the compression resistance of the crucible wall comes into effect. The freely standing arrangement of the core permits such deformation and displacement, respectively. In this case, additionally, the head of the carrying pin, which is so dangerous for occurring accidental jolts, remains covered in a favorable manner.

In order to form a core freely standing, and furthermore, in order to achieve also an overlapping of the head of the carrying pin and a form-technically favorable design, and in order to render a higher stability, similarly to the effect of a stabilizing grip, to the bottom portion within the range of the zone overlapped by the head of the carrying pin, in accordance with the present invention, the core is formed inside of the hollow, conical sleeve of a collar projecting from the bottom portion of elastic-yielding material.

It is a further object of the present invention to provide a service knob, which includes a collar which is bent outwardly at its upper edge and is there taken in by a cover. This permits a favorable and easy securing of the cover by means of a clip and a simplified deformation of the collar in case of jolts, which arrive axially in the direction of the carrying pin.

It is, in accordance with the present invention, also of advantage, that the cover is formed conically at its upper side and has at its edge a roof-like inclined face, which engages the end face of the collar and on which an inwardly directed angular formation adjoins, which brings about the under-gripping at the edge of the collar.

A simpler manufacture of the service knobs can also be brought about by obtaining the same effect in such manner, that the core is formed of a cap-shaped cover, which is stabile and disposed freely standing in the hollow space and equipped with its lower edge inserted in an annular groove disposed adjacent the bottom portion.

By this arrangement, a progressive increase of the pillow characteristic is obtained by a displacement of the cap-shaped cover together with its holding annular groove.

An advantageous design is obtained in accordance with the present invention by the fact, that the metal, cap-shaped cover freely overlaps the head of the carrying pin and has at its lower edge a rib directed outwardly and entering the annular groove.

The cover spread into elastic material yields lightly in turn in case of jolts hitting the same and assumes accidental jolts prior to hitting, for instance, the rigidly disposed carrying pin. The outwardly directed rib of the cover contributes to the transmission of the stabilizing effect on the bottom zone and prevents also that the cover jumps out in case of normal pushing loads.

A design advantageous beyond that is realized, in accordance with the present invention, such, that the bottom portion has at its side, towards the hollow space of the conical sleeve, an annular groove overlapped by the cover and disposed concentrically to the hub.

This annular groove brings about practically a step-wise enlargement of the pillow-resistance in case of lateral jolts. At the upper edge of the conical sleeve the walls stand free and can be turned over in case of lateral jolts. The pillow resistance increases closer to the bottom portion. An appreciable portion of the jolt energy is assumed by the lower edge of the cover, which is supported with its total half-circular periphery disposed opposite the jolting point and which, in case of comparatively high jolt energies, makes possible also a certain deformation by bending over of the side walls due to the cap shape. Starting from the bottom of the groove up, where the bottom surrounds the carrying pin as full material, the pillow-resistance corresponds substantially with the compressibility of the material.

A further feature of the present invention resides in the fact that the wall of the conical sleeve is formed step-like at its upper edge on its outside. This increases the gripping possibilities and stabilizes the upper edge zone of the completely freely standing wall and favors finally also an approximately bellows-like deformation of the wall upon hitting of a jolt in axial direction of the carrying pin.

With these and other objects in view, which will become apparent in the following detailed description, the present invention will be clearly understood in connection with the accompanying drawing, in which:

FIGURE 1 is a side elevation of the service knob;

FIG. 2 is a section along the line 2—2 of FIG. 1 including also a carrying pin;

FIG. 3 is a section similar to that of FIG. 2, however, shown in a deformed position upon receiving a jolt;

FIG. 4 is a side elevation of another embodiment of the service knob;

FIG. 5 is a section along the lines 5—5 of FIG. 4;

FIG. 6 is a section along the lines 6—6 of FIG. 5; and

FIG. 7 is a section similar to that shown in FIG. 5, however, in a deformed position upon receiving a jolt.

Referring now to the drawing, and in particular to FIGS. 1 and 2, the service knob has in the embodiment shown in FIGS. 1 and 2 a thick-walled bottom portion 1 rendering the necessary stability for the service and an adjacent thin wall 2 adjoining the bottom portion 1 and made of elastic-yielding material.

The bottom portion 1 forms the hub 3 for a carrying pin 4. The carrying pin 4 has an annular inclined face 5 and a head 6. The service knob is mounted on the carrying pin 4 merely by sliding the service knob onto the carrying pin 4. The head 6 engages, thereby, the upper face 1' of the bottom portion 1 and prevents removal of the service knob from the carrying pin 4. The annular shoulder or the annular inclined face 5 prevents a further movement onto the carrying pin 4.

The thin wall 2 forms a conical sleeve defining a hollow inner space 7, in which hollow inner space 7 is provided a collar 8 projecting from the bottom portion 1. The collar 8 is made integrally with the bottom portion 1 and with the walls 2 of the service knob of the same elastic-yielding material, preferably an artificial mass spraying process. An annular groove 9 is provided on the lower side of the bottom portion 1 and concentrically to the hub 3.

The freely standing disposed collar 8 is bent outwardly at its upper edge 10. It is covered up by a cover 11. The latter is formed concave at its upper side and is equipped at its edge with a roof-like extending inclined face 12 which engages the end face 10' of the collar edge and which is continued by an inwardly directed angular portion 13 which under-grips the angular edge 10.

The wall 2 of the service knob forms adjacent its upper edge a slightly thickened zone 2'.

The operation of the service knob in case of a strong jolt at the occasion of an accident is demonstrated in FIG. 3. Here, the wall 2 moves toward the collar 8, whereby the wall 2, as well as the wall of the collar 8 is deformed and the jolting work is favorably absorbed. The deformation transmits itself, as shown, also to the walls not directly hit by the jolts, so that their fighting deformation resistance cooperates in the same manner.

Referring now again to the drawing, and in particular to FIGS. 4 to 7, another embodiment of the present invention is disclosed, in which the core is formed by a cap-shaped cover 17, which is freely standing disposed in the hollow space 7 of the conical sleeve.

The service knob disposed on the carrying pin 4 has a thick-walled bottom portion 1, which is equipped with a concentric groove 14 open in upward direction, and furthermore, forms the knob 15 for the carrying pin 4.

The carrying pin 4 can be freely projecting on a window crank or can form, for instance, a portion of a pull switch or the like. It has a head 6 and furthermore, the shoulder-like inclined face 5, which is complementary to the inner wall of the hub 15, so that the service knob can be mounted merely by sliding it onto the carrying pin 4, whereupon the head 6 of the carrying pin 4 engages the upper face 1' of the bottom portion 1.

The relatively thinner wall 2 follows the bottom portion 1, which thinner wall 2 forms a hollow conical sleeve. This wall 2 is equipped at its upper edge on its outside with steps 16.

In side of the hollow space 7 is a cap-shaped cover 17. The latter has a side wall 18, which is transformed at the lower edge 19 into an outwardly directed rib 19'. This rib 19' enters into the annular groove 20 provided at the level of the upper face 1' of the bottom portion 1. This entrance takes place by gripping in the collar 19' into the annular groove 20. The cover 17 is taken in at its upper face.

The annular groove 20 is formed by a projecting ring lip 21, which extends up to the side wall 18 of the cap-shaped cover 17 and the rib 19' enters with its slightly raised outer edges 19'' below the annular rib 21, which arrangement brings about a counter-hook-like engagement and an easier gripping in of the cover 17.

The bottom portion 1 and the wall 2 are integrally formed of corresponding elastic-yielding material, preferably, in a pressure spray process.

The operation of this embodiment is as follows:

Due to the freely standing arrangement of the cap-shaped cover 17 within the hollow space 7, the free deformation of the wall 2 with the conical sleeve is not curtailed. In case of lateral jolts against the wall 2, the latter can be turned over in proper manner by exploitation of its inner elasticity, as it is apparent from FIG. 7, whereby the impinging jolt energies are caught in an accident-preventing manner. Depending upon the size of the occurring jolt energies, the freely standing wall engages then the cap-shaped cover 17. The latter assumes further jolt energies with a progressive increase of the pillow resistance. On the other hand, the stabile cap-shaped cover 17 affects in a stabilizing manner the bottom portion 1 of the service knob, due to the entering into the annular groove 20 disposed next to the bottom portion 1. The bottom zone, which is subjected to a certain stabilization in the central range of the carrying pin, is additionally stabilized by the edge of the cover 17 in a further outwardly disposed zone arranged concentrically thereto. The entire service knob can thus be made integrally of particularly yielding material in a proper adjustment for its application, without being confronted with the danger of an insufficient stability against servicing forces.

While we have disclosed several embodiments of the present invention, it is to be understood that these embodiments are given by example only and not in a limiting sense, the scope of the present invention being determined by the objects and the claims.

We claim:

1. A service knob, particularly for switches, slides, window-cranks, or the like, provided in automotive vehicles, comprising
    a thick-walled bottom portion providing the stability necessary for the service,
    said thick-walled bottom portion forming a hub portion adapted to receive a carrying pin, and extending into thinner wall portions of elastically yielding material,
    said thinner wall portions forming a hollow conical sleeve, the latter defining an inner space,
    a hollow core projecting from said bottom portion and freely standing in said inner space, and
    said hollow core yielding in case of a deformation of said service knob leading to an engagement of said elatsically yielding knob walls with a progressive increase of the pillow resistance.

2. The service knob, as set forth in claim 1, wherein said hollow core comprises a collar of elastically yielding material projecting from said bottom portion within said inner space of said hollow conical sleeve.

3. The service knob, as set forth in claim 2, wherein said collar is edged off outwardly at its upper edge, and which includes
    a cover undegripping said upper edge of said collar.

4. The service knob, as set forth in claim 3, wherein
said cover is concave at its upper side and forms at edge a roof-like inclined face, which sits on the end face of said collar, and
an inwardly directed angular formation continued by said cover, said angular formation bringing about the undergripping on the edge of said collar.

5. The service knob, as set forth in claim 1, wherein said hollow core comprises a cap-shaped, stabile cover freely standing in said inner space and having a lower edge portion,
said bottom portion has an annular groove receiving said lower edge portion of said cover.

6. The service knob, as set forth in claim 5, wherein said cover is freely overhanging the head of a carrying pin and has at its lower edge an outwardly directed rib entering said annular groove of said bottom portion.

7. The service knob, as set forth in claim 6, wherein said bottom portion has at its side opposite said inner space of said conical sleeve an annular groove covered by said cover and disposed concentrically to said hub portion of said bottom portion.

8. The service knob, as set forth in claim 7, wherein said thin walls of said conical sleeve have on their outside a stepped-up formation.

References Cited by the Examiner
UNITED STATES PATENTS

| | | | |
|---|---|---|---|
| 2,149,375 | 3/1939 | Wiebe | 16—86 |
| 3,071,023 | 1/1963 | Herr et al. | 16—121 X |

JOSEPH D. SEERS, *Primary Examiner.*

D. L. BURGESS, *Assistant Examiner.*